United States Patent
Choi et al.

(10) Patent No.: US 10,846,676 B2
(45) Date of Patent: Nov. 24, 2020

(54) FINANCIAL DEVICE AND CONTROL METHOD AND SYSTEM THEREOF

(71) Applicant: ATEC AP CO., LTD., Seongnam-si (KR)

(72) Inventors: Yong Gyun Choi, Seoul (KR); Kyung Hee Kim, Seoul (KR); Kwang Hyun Park, Seoul (KR); Han Yong Park, Seoul (KR); So Young Kim, Incheon (KR)

(73) Assignee: ATEC AP CO., LTD., Seongnam-si (KR)

(*) Notice: Subject to any disclaimer, the term of this patent is extended or adjusted under 35 U.S.C. 154(b) by 464 days.

(21) Appl. No.: 15/133,672

(22) Filed: Apr. 20, 2016

(65) Prior Publication Data

US 2016/0307175 A1    Oct. 20, 2016

(30) Foreign Application Priority Data

Apr. 20, 2015  (KR) .................. 10-2015-0055449

(51) Int. Cl.
| | |
|---|---|
| *G06Q 20/20* | (2012.01) |
| *G06Q 20/18* | (2012.01) |
| *G06Q 20/10* | (2012.01) |
| *G07F 19/00* | (2006.01) |
| *G07D 11/20* | (2019.01) |
| *G07D 11/50* | (2019.01) |

(52) U.S. Cl.
CPC ......... *G06Q 20/20* (2013.01); *G06Q 20/1085* (2013.01); *G06Q 20/18* (2013.01); *G07D 11/20* (2019.01); *G07D 11/50* (2019.01); *G07F 19/20* (2013.01); *G07F 19/202* (2013.01)

(58) Field of Classification Search
CPC .... G06Q 20/20; G06Q 20/1085; G06Q 20/18; G07D 11/0051; G07D 11/0084; G07F 19/20; G07F 19/202
USPC .......................................................... 705/16
See application file for complete search history.

(56) References Cited

U.S. PATENT DOCUMENTS

| | | | |
|---|---|---|---|
| 2001/0027500 A1* | 10/2001 | Matsunaga | ........... G06F 13/385 710/104 |
| 2006/0213754 A1* | 9/2006 | Jarrett | ................... G06F 3/0489 200/43.01 |

(Continued)

FOREIGN PATENT DOCUMENTS

| | | |
|---|---|---|
| CN | 101083008 A | 12/2007 |
| CN | 101520923 A | 9/2009 |
| CN | 103854383 A | 6/2014 |

(Continued)

OTHER PUBLICATIONS

European Search Report dated Sep. 8, 2016 in European Application No. 16166199.6.

(Continued)

*Primary Examiner* — Florian M Zeender
*Assistant Examiner* — Joseph M Mutschler
(74) *Attorney, Agent, or Firm* — Saliwanchik, Lloyd & Eisenschenk

(57) ABSTRACT

The present invention relates to a financial device and a control method and system thereof. The financial device may comprise: one or more selection portions; and a control unit configured to process any one of a plurality of financial processes, when any one of the one or more selection portions is input.

8 Claims, 8 Drawing Sheets

(56) References Cited

U.S. PATENT DOCUMENTS

2014/0156482 A1* 6/2014 Kim .................. G06Q 40/02
                                                    705/35
2014/0291110 A1* 10/2014 Adachi ............... G07D 11/14
                                                    194/206

FOREIGN PATENT DOCUMENTS

| EP | 1816612 A1 | 8/2007 |
| KR | 10-2009-0004510 A | 1/2009 |
| KR | 20100023253 A | 3/2010 |
| KR | 20140070239 A | 6/2014 |

OTHER PUBLICATIONS

Office Action dated Feb. 6, 2018 in Chinese Application No. 201610247431.7.
Notice of Allowance dated Apr. 10, 2017 in Korean Application No. 10-2015-0055449.

* cited by examiner

FINANCIAL DEVICE AND CONTROL METHOD AND SYSTEM THEREOF

CROSS-REFERENCE TO RELATED APPLICATION

This application claims the benefit under 35 U.S.C. § 119 of Korean Patent Application No. 10-2015-0055449, filed Apr. 20, 2015, which is hereby incorporated by reference in its entirety.

BACKGROUND

1. Technical Field

The present disclosure relates to a financial device and a control method and system thereof.

2. Related Art

A financial device such as a teller casher recycler TCR refers to an ATM (Automated Teller Machine) which performs cash deposit/withdrawal and inquiry. The financial device not only performs a simple counting process, but also performs a composite process such as deposit and withdrawal.

When a user such as a teller or customer uses the conventional financial device, the user must put media into a slot and then select a deposit or counting process to perform a desired operation, unlike a simple media counter. Thus, the conventional financial device must follow two processes of putting media and selecting a counting process, in order to perform a simple counting operation.

That is, for the simple counting operation of the conventional financial device, a user must select a desired process after putting media into the slot. Thus, the procedure of the financial device is inconvenient.

SUMMARY

Various embodiments are directed to a financial device which is capable of simplifying financial processes by immediately performing a matched operation through an operation of simply inputting a button without selecting a process, and a control method and system thereof.

In an embodiment, a financial device may comprise: one or more selection portions; and a control unit configured to process any one of a plurality of financial processes, when any one of the one or more selection portions is input.

In another embodiment, a control system of a financial device may comprise: one or more user terminals configured to transmit one or more process requests; and the financial device comprises one or more selection portions, and a control unit that is configured to process any one of a plurality of financial processes when the one or more selection portions are input.

In another embodiment, a control method of a financial device may comprise: detecting that one or more selection portions are input, the one or more selection portions each being matched with a plurality of processes; determining a input state of the one or more selection portions or a input method for the one or more selection portions, when the one or more selection portions are input; determining a selected process among the plurality of processes according to the input state of the one or more selection portions or the input method for the one or more selection portions; and performing, by the financial device, the selected process.

BRIEF DESCRIPTION OF THE DRAWINGS

In the plurality of drawings, like reference numerals represent the same elements.

DETAILED DESCRIPTION OF THE EMBODIMENTS

Figure 1:
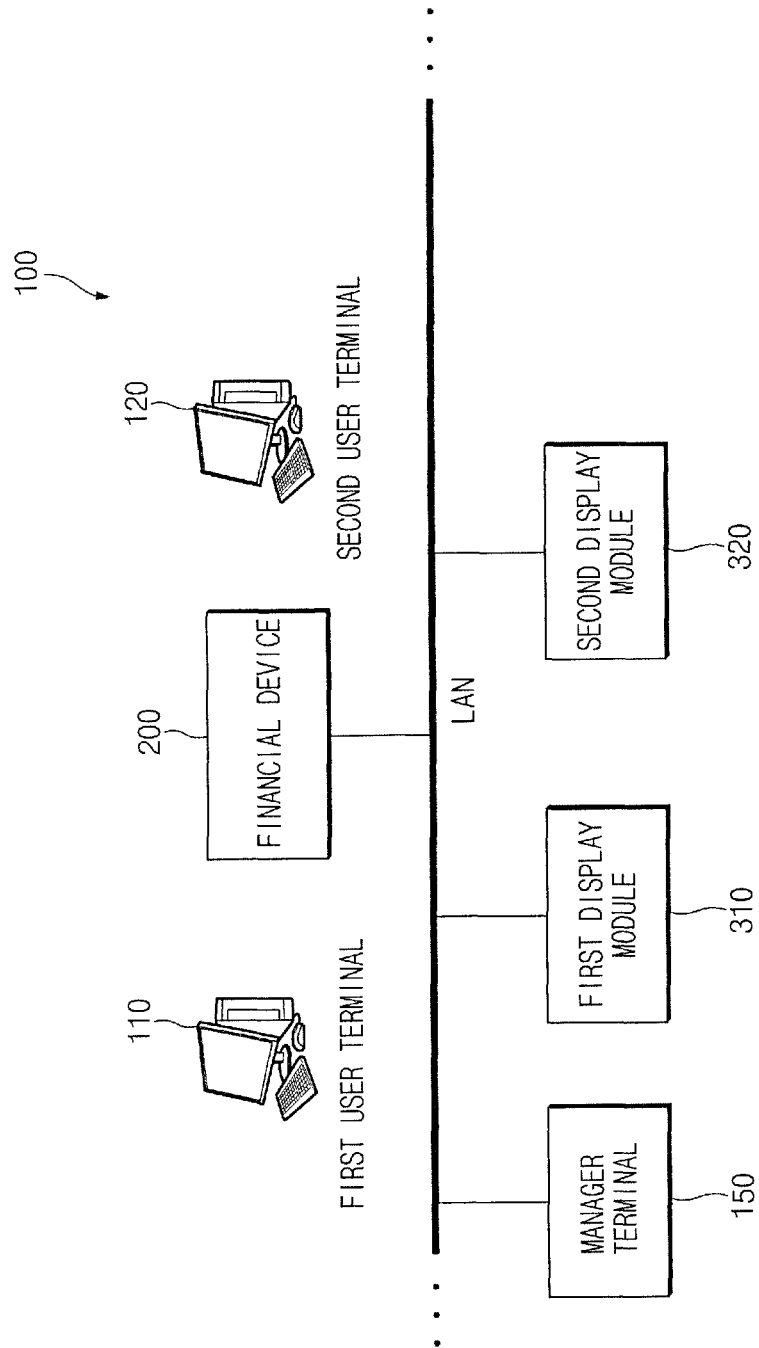
FIG. 1 is a diagram illustrating a finance handling system using a financial device according to an embodiment.

Hereinafter, exemplary embodiments of the present disclosure will be described with reference to the accompanying drawings. Regarding the reference numerals assigned to the elements in the drawings, it should be noted that the same elements may be designated by the same reference numerals, wherever possible, even though they are shown in different drawings. Also, in the description of embodiments, detailed description of well-known related structures or functions may be omitted when it is deemed that such description may cause ambiguous interpretation of the present disclosure Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial business, such as medium processing comprising processing such as deposit processing, giro receipt, or gift certificate exchange and/or processing such as withdrawal processing, giro dispensing, or gift certificate dispensing by receiving various media such as, e.g., paper money, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial business such as a financial information system (FIS).

Hereinafter, assuming that the financial device is an ATM, an embodiment will be described. However, this assumption is merely for convenience of description, and the present invention is not limited to the ATM.

Hereafter, the embodiments will be described with reference to the accompanying drawings.

FIG. 1 is a diagram illustrating a finance handling system using a financial device according to an embodiment.

Referring to FIG. 1, the finance handling system 100 using a financial device according to the embodiment may comprise one or more user terminals 110 and 120, a financial device 200 used by the user terminals, and a manager terminal 150 for managing the financial device. The user terminals 110 and 120 are not limited to a teller terminal used by a teller or a terminal used by a general customer, but may comprise any terminals as long as they can be connected to the financial device through a network. The components may be connected through a wired network such as LAN (Local Area Network) or a wireless network such as WiFi or Bluetooth, in order to transmit/receive data.

Specifically, the first and second user terminals 110 and 120 of FIG. 1, which are used by users such as tellers, may be implemented in the form of a PC (Personal Computer) or implemented in the form of a portable electronic terminal such as a smart pad or table PC. In FIG. 1, the first and second user terminals 110 and 120 may be directly connected to the financial device 200, and all user terminals may be connected through a wireless or wired communication network. Examples of the communication network may comprise NFC (Near Field Communication), LAN, WAN (Wide Area Network) and the Internet. The user terminals 110 and 120 may operate the financial device 200, and check the state and ready money of the financial device 200.

The user terminals 110 and 120 may comprise display modules 310 and 320, and the display modules 310 and 320 may comprise a monitor through which a customer can check a media counting state in real time. At this time, the first display module 310 may be formed at the first user terminal 110, and the second display module 320 may be formed at the second user terminal 120. When a first user using the first user terminal 110 occupies the financial device 200, output data of the financial device 200 are outputted through the first display module 310, and the second display module 320 displays a waiting screen. On the other hand, when a second user using the second user terminal 120 occupies the financial device 200, output data of the financial device 200 are outputted through the second display module 320, and the first display module 310 displays a waiting screen.

The financial device 200, as an ATM performs a variety of processes which comprise a deposit/withdrawal process through an operation of a general customer, the user terminals 110 and 120 or a teller, a process of counting media to be deposited or withdrawn and storing the counting result, a counterfeit detection process and an inquiry process. At this time, the media counted by the financial device 200 may comprise paper money such as cashes and checks and transaction media such as marketable securities and gift certificates. In the present embodiment, the first and second user terminals 110 and 120 may share one financial device 200. However, the present embodiment is not limited thereto, and the financial device 200 may be shared by two or more user terminals. Furthermore, the financial device 200 may be used by one customer or teller.

When a command is received from the user terminal 110 or 120 after the media are inserted, the financial device 200 performs the corresponding command. In the present embodiment, however, when a teller input a command, for example, by pressing or clicking a button illustrated in FIG. 2, the financial device 200 immediately performs a counting operation. That is, when a teller input a command by pressing or clicking a button regardless of a command of the user terminal 110 or 120, the financial device 200 immediately performs a counting operation. At this time, when a button is pressed, the financial device 200 performs one counting operation, and then enters an idle state.

Furthermore, the financial device 200 may receive an occupation request and an occupied process request from the user terminals 110 and 120, and process the received requests.

The occupation request may indicate that the user terminals 110 or/and 120 request an occupation for the financial device 200 in order to process a financial work, and the occupied process request may indicate a request for a deposit/withdrawal process, a process of counting media to be deposited/withdrawn and storing the counting result, a process of detecting a counterfeit note or an inquiry service. When a process request is allowed, the occupation and process can be conducted at the same time, without a separate occupation request.

Thus, the financial device 200 according to the embodiment may perform a corresponding command when a user presses or clicks a button and then inserts media without performing two processes of selecting media insertion and selecting a command. Thus, the financial device 200 can increase the work efficiency and reduce the handling time. The configuration and operation of the financial device 200 will be described in more detail with reference to FIGS. 2 to 5.

The manager terminal 150 is connected to the financial device 200 and the plurality of user terminals 110, 120 and 130, and enables a manager to monitor the state and ready money of the financial device in real time. The manager terminal 150 may be provided in the form of a mobile PC or general PC.

Figure 2:
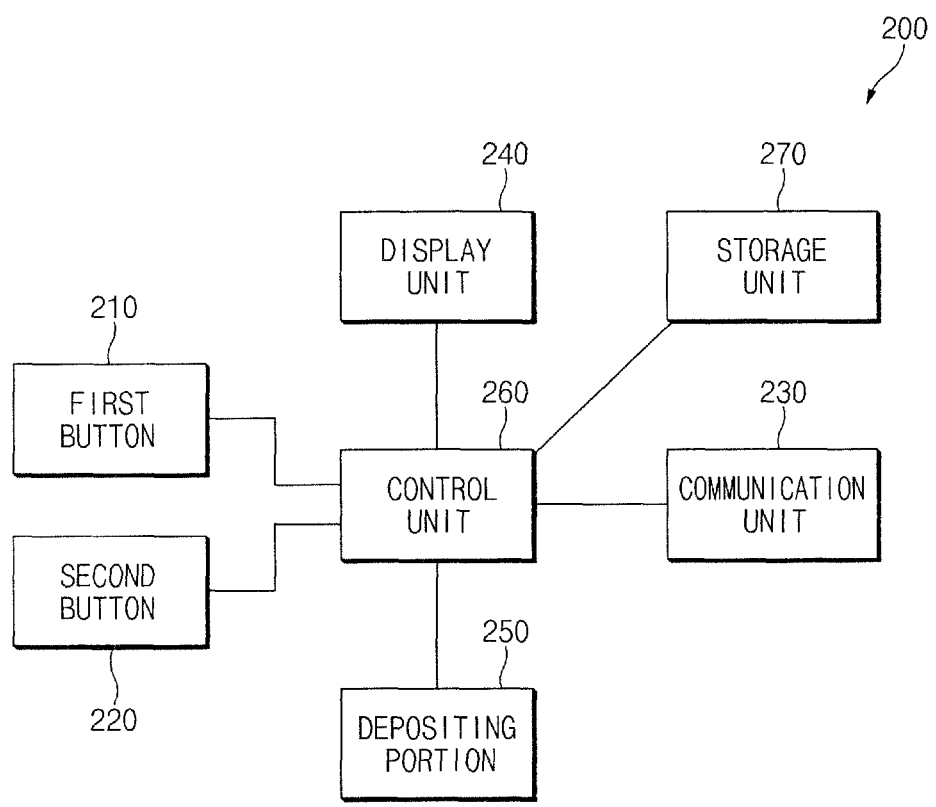
FIG. 2 is a block diagram illustrating components of the financial device according to the embodiment.

FIG. 2 is a block diagram illustrating components of the financial device according to the embodiment. The financial device 200 according to the present embodiment may comprise a first button 210 pressed by a first user, a second button 220 pressed by a second user, a communication unit 230 configured to exchange data and control signals with the user terminals 110 and 120, a display unit 240 configured to display an ongoing operation, an depositing portion 250 into which media are deposited, a control unit 260 configured to control the respective units, and a storage unit 270. Hereafter, for convenience of description, the present embodiment is based on the assumption that the first button 210 is used by the first user and the second button 220 is used by the second user, but not limited thereto. For example, the first and second buttons 210 and 220 may be pressed by the same teller or customer, and each of the first and second buttons 210 and 220 may be shared by a plurality of tellers or users.

When the first and second buttons 210 and 220 are pressed or clicked by the first or second user, the first and second buttons 210 and 220 transmit a button signal to the control unit 260. The first and second buttons 210 and 220 may correspond to an example of a selection portion described in claims. At this time, the first and second buttons 210 and 220 may be implemented with protruding hardware buttons, switches, and touch buttons. In the present embodiment, however, the case in which the first and second buttons 210 and 220 are implemented with hardware buttons will be taken as an example for description. FIG. 1 illustrates an example in which two user terminals 110 and 120 share one financial device 200, and FIG. 2 illustrates an example in which one financial device 200 comprises two buttons 210 and 220. However, the present embodiment is not limited thereto, but one financial device 200 may comprise a plurality of buttons. Furthermore, FIG. 2 illustrates an example in which the first and second buttons 210 and 220 are command buttons for media counting. However, the present embodiment is not limited thereto, but the first and second buttons 210 and 220 may be mapped to various commands such as deposit, withdrawal and counterfeit detection.

The communication unit 230 transmits and receives data and control signals to and from the user terminals 110 and 120. That is, the communication unit 230 receives an occupation request or occupied process request from the user terminals 110 and 120, and transmits data such as a counting result from the control unit 260 to the display modules 310 and 320. Furthermore, the communication unit 230 transmits and receives data required for process execution between the financial device and the user terminals. For example, the communication unit 230 notifies a process execution result.

The display unit 240 displays a media counting result and the current state or abnormal state of the financial device 200.

The depositing portion 250, into which media are deposited, senses deposition of media and counts the media.

When the control unit 260 receives a button signal from the first or second button 210 and 220, the button signal indicating that a button was pressed or clicked, the control unit 260 determines the current state of the financial device 200. When the financial device 200 is idle, the control unit 260 simply counts the media in the depositing portion 250, and outputs the counting result to a display module of a user having requested the counting operation. When the financial device 200 is not idle or when the financial device 200 is occupied by another user or under maintenance, the control unit 260 ignores the pressing operation for the first or second button 210 or 220, and continues the ongoing operation (the occupied process or maintenance work).

When media are inserted into the depositing portion 250, the control unit 260 determines the current state of the financial device 200. When the financial device 200 is currently idle, the control unit 260 waits until the first or second button 210 or 220 is pressed or clicked. Then, when the first or second button 210 or 220 is pressed or clicked, the control unit 260 simply counts the media in the depositing portion 250, and outputs the counting result to the display module of the user having requested the counting operation.

When an occupation request is received from one or more user terminals, the control unit 260 determines whether the financial device 200 is idle. Furthermore, when the financial device 200 is idle, the control unit 260 accepts the occupation request of the corresponding user terminal, or when the financial device 200 is not idle, the control unit 260 determines that the financial device 200 is occupied by another user, and continues an occupied process for the user. At this time, the occupation by another user indicates that a counting operation requested by the user is being performed or the occupied process by the user's terminal is being performed. At this time, when the first or second button 210 or 220 is pressed or clicked while the occupied process by another user is performed, the control unit 260 invalidates the press or click, and records the press or click in the storage unit 270. Furthermore, when the financial device 200 is occupied by another user, the control unit 260 informs the display unit 240 or a user terminal having requested an occupation that the financial device 200 is occupied.

The storage unit 270 stores information on the first or second button 220. At this time, the information on the first or second button 210 or 220 may comprise time points that the first or second button 210 or 220 was pressed or clocked and how many times the first or second button 210 or 220 was pressed or clicked.

The storage unit may store a plurality of financial processes. The plurality of financial processes may comprise various types of counting processes.

In the present embodiment, the counting method may be divided into a simple counting method, a designated number counting method, and a medium classification method. The simple counting method refers to a method which continuously counts deposited media until a withdrawal portion is full of the media, and outputs the counting result to a display module. The designated number counting method refers to a method which counts inserted media on a basis of a previously designated number (for example, 50 or 100), arranges the counted media in an withdrawal portion, and counts the other media after a user takes out the media in the withdrawal portion. The medium classification method refers to a method which transfers only the same type of media as a first note of deposited media to a withdrawal portion, and transfers the other media to a collecting portion. For example, when counting is performed in a state where a 50,000-won note is positioned at the head of the media, 50,000-won notes mixed in the media are sorted to be positioned at the head of the media.

Two or more of the simple counting method, the designated number counting method, and the note classification method may be performed at the same time. For example, the designated number counting method and the note classification method can be performed at the same time. In this case, while the note classification method is performed, media may be aligned in the exit slot on a basis of the designated number. Then, when a user takes out the media in the exit slot, note classification may be continuously performed on the other media.

FIG. 2 illustrates an example in which only the first and second buttons 210 and 220 are formed according to the number of users. However, a plurality of buttons may be formed according to the types of the counting methods, and mapped to the respective counting methods. In this case, software buttons as well as hardware buttons may be used.

Furthermore, a plurality of buttons may be mapped to various process such as deposit and withdrawal process as well as the simple counting process, or only one button for the most necessary process may be provided to simplify the financial device, if necessary.

Figure 3:
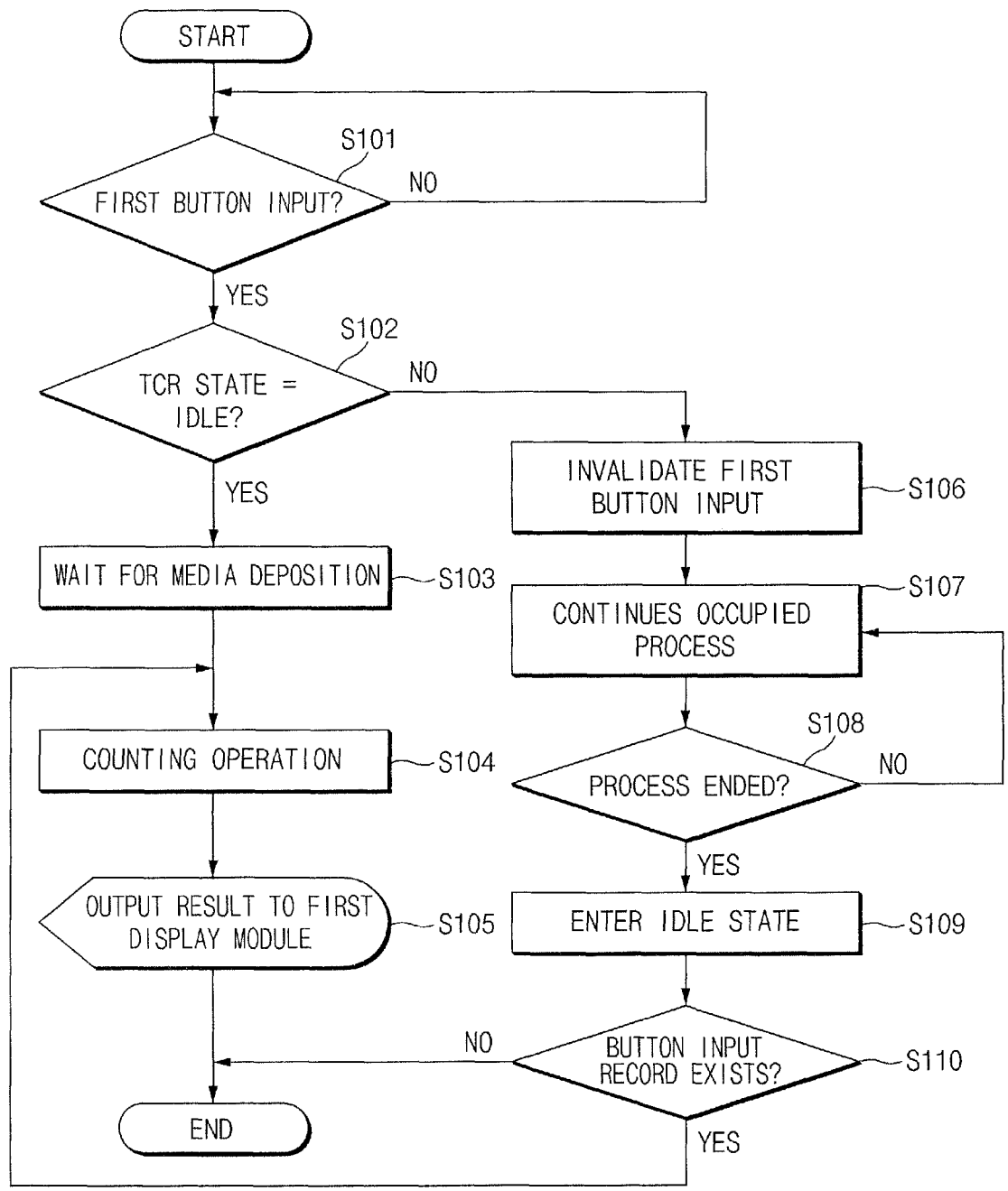
FIG. 3 is a flowchart showing a control method of a financial device according to an embodiment.

Hereafter, referring to FIGS. 3 to 5, a control method of the financial device 200 will be described in detail. FIG. 3 is a flowchart showing a control method of a financial device according to an embodiment. For convenience, the control method will be described with reference to the configurations of FIGS. 1 and 2. The control method of a financial device, which will be described with reference to FIG. 3, relates to the operation of the financial device 200 for one or more user terminals 110 or 120, when the button 210 or 220 is pressed before media are inserted. At this time, a case in which the first button 210 is first pressed will be taken as an example for description. FIG. 3 illustrates a process when the first button 210 is first pressed before media are inserted. Even when the second button 220 is pressed before media are inserted, the same process as the process of FIG. 3 may be applied.

Referring to FIG. 3, when a button signal is inputted as the first button 210 of the financial device 200 is pressed or clicked by a user, the control unit 260 determines whether the financial device 200 is idle, at step S102. When the financial device 200 is idle, the control unit 260 waits for media insertion at step S103. Then, when media are inserted into the depositing portion 250, the control unit 260 detects the media insertion and immediately performs counting at step S104, and outputs the counting result to the display unit 240 and/or the display module 310 at step S105. At this time, when the media insertion is detected, the control unit 260 may immediately start counting without a separate operation or start counting when a predetermined time elapses after the media are inserted.

When it is determined at step S102 that the financial device 200 is not idle but occupied by another user terminal or another user, the control unit 260 invalidates the input of the first button 210 at step S106. At this time, the input of the first button 210 may be recorded in the storage unit 270. Then, the financial device 200 continuously executes the occupied process at step S107. Then, the control unit 260 determines whether the occupied process was ended, at step S108. When the process was ended, the control unit 260 controls the financial device 200 to enter the idle state at step S109.

Then, the control unit 260 determines whether a button input has been recorded during the process from step S106 to step S109, at step S110. When a button input has been recorded, the control unit 260 proceeds to step S104 to perform a counting operation.

Figure 4:
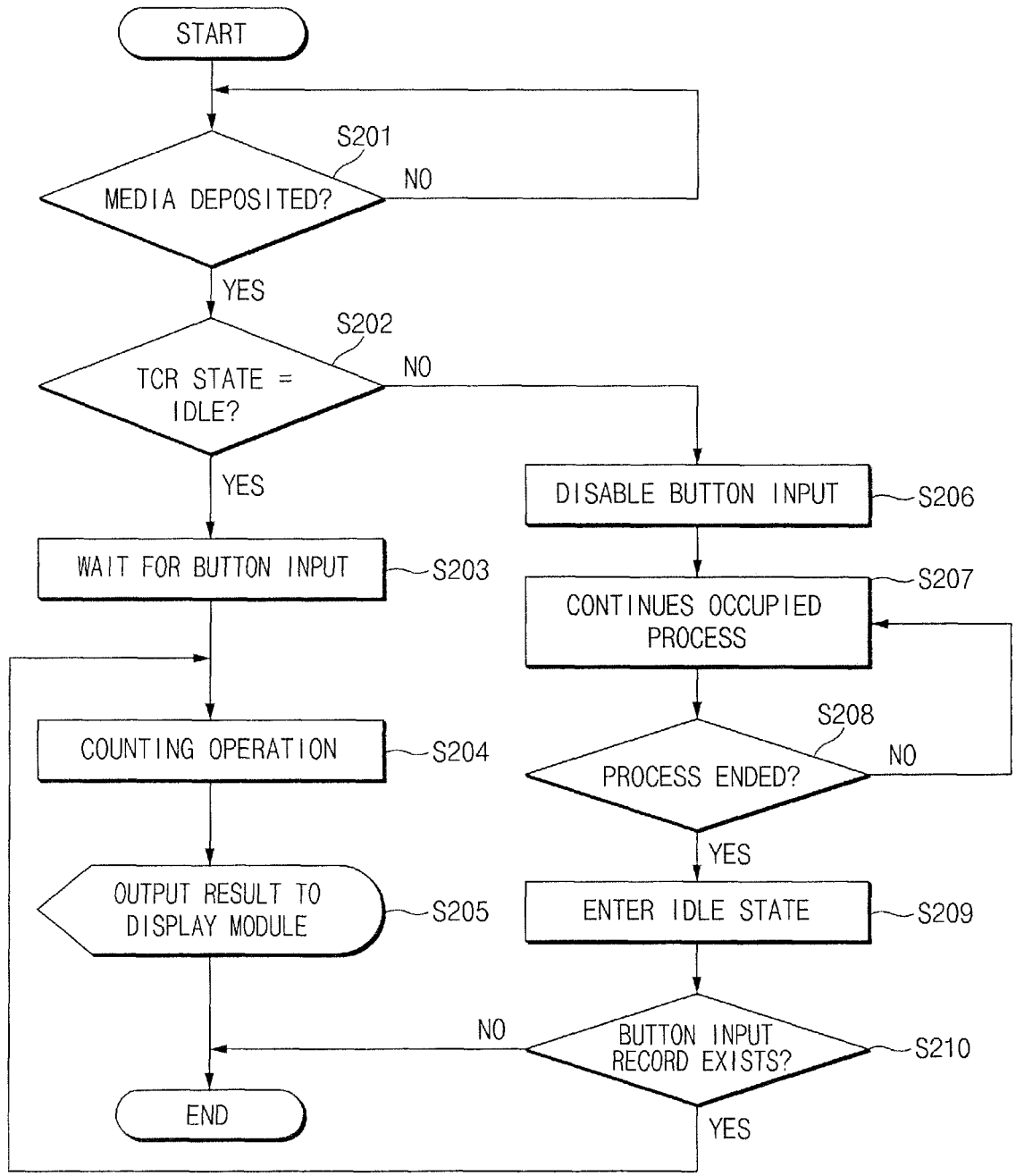
FIG. 4 is a flowchart showing a control method of a financial device according to another embodiment.

FIG. 4 is a flowchart showing a control method of the financial device 200 according to another embodiment. FIG. 4 illustrates a case in which media are inserted before the button 210 or 220 is pressed.

First, the control unit 260 determines whether media are inserted into the depositing portion 250 at step S201. When the media are inserted, the control unit 260 determines whether the financial device 200 is idle, at step S202.

When the financial device 200 is idle, the control unit 260 waits for a button input at step S203. Then, when a button input is received, the control unit 260 immediately performs counting at step S204, and outputs the counting result to the display unit 240 and/or the display module 310 at step S205.

When it is determined at step S202 that the financial device 200 is not idle but occupied by another user terminal or another user, the control unit 260 disables the button or invalidates a button signal generated by a press of the button, at step S206. That is, although a button is pressed, a button signal may not be applied to the control unit 260, and a signal indicating that the button input operation was stopped may be outputted to the display unit 240.

At this time, the financial device 200 continues the occupied process at step S207. Then, the control unit 260 determines whether the occupied process was ended, at step S208. When the process was ended, the control unit 260 controls the financial device 200 to enter the idle state at step S209. Furthermore, the control unit 260 outputs a signal to the display unit 240, the signal indicating that the financial device 200 is idle.

At this time, when a button input is generated during the process from step S206 to step S209, the control unit 260 stores the input signal in the storage unit 270 even though the button is disabled or the button signal is ignored. Then, when the financial device 200 enters the idle state, the control unit 260 determines whether a button input has been recorded during the process from the step S206 to the step S209, at step S210. When a button input has been recorded, the control unit 260 proceeds to the step S204 to perform a counting operation. As such, the financial device 200 can conveniently perform a counting operation only through an operation of pressing the first or second button 210 or 220 after the media are inserted.

Figure 5:
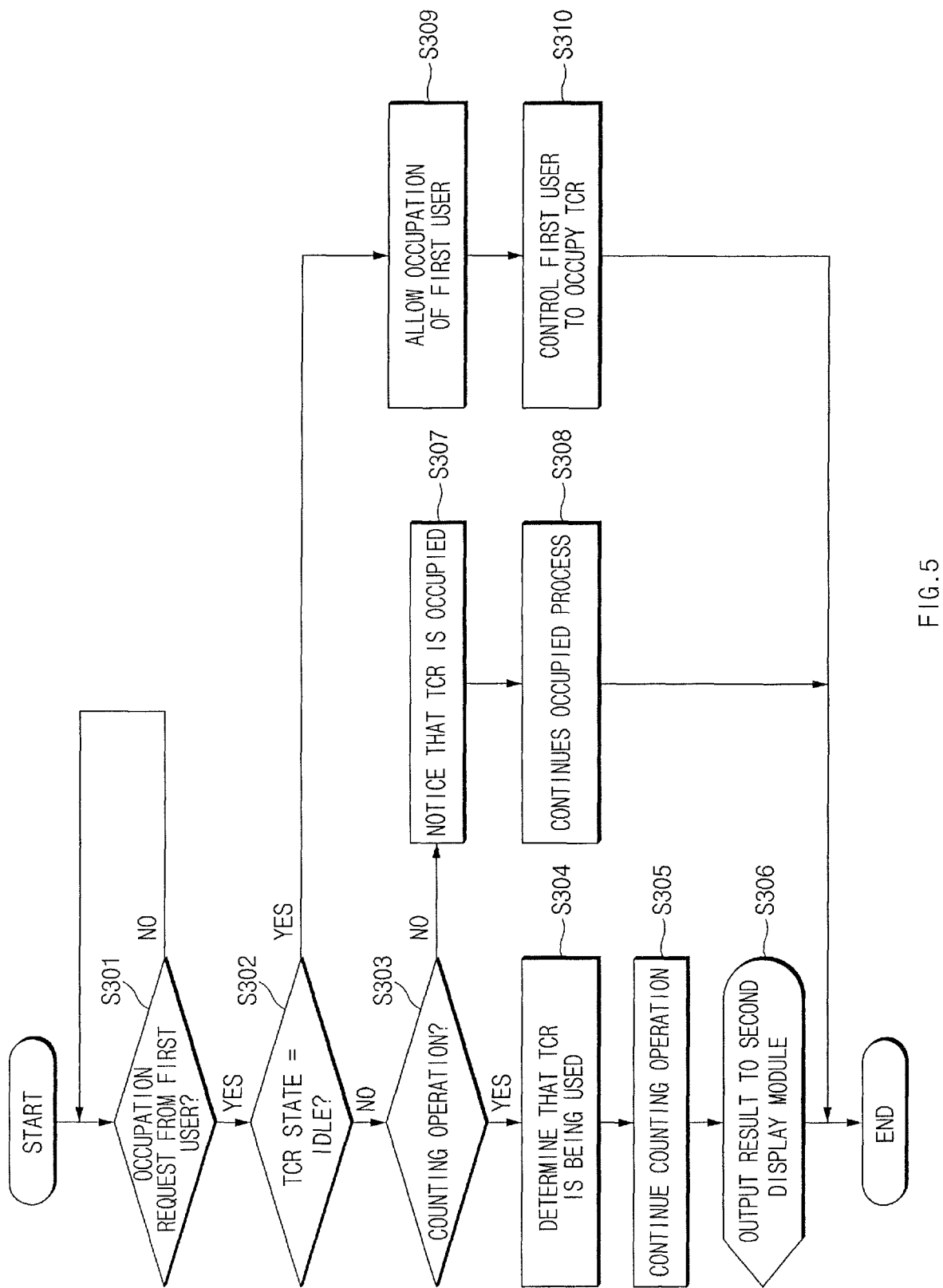
FIG. 5 is a flowchart showing a control method of a finance handing apparatus according to another embodiment.

FIG. 5 is a flowchart showing a control method of the financial device 200 according to another embodiment, illustrating a method for handling a separate occupation request for the financial device 200 and the button 210 and 220. When the conventional financial device 200 receives an occupied process request (for example, deposit, withdrawal, counting or counterfeit detection) and executes the occupied process, occupation is performed while the occupied process is executed. That is, the conventional financial device 200 does not require a separate occupation request. In the present embodiment, however, a user can make an occupation request regardless of an occupied process. FIG. 5 illustrates such a process. Referring to FIG. 5, the control unit 260 determines whether an occupation request exists, at step S301. When an occupation request is provided from a user, the control unit 260 determines whether the financial device 200 is idle, at step S302. At this time, a case in which an occupation request is provided from the first user will be taken as an example, for convenience of description.

When the financial device 200 is not idle, the control unit 260 determines whether the financial device 200 is performing a counting operation, at step S303. When the financial device 200 is performing a counting operation, the financial device 200 determines that the financial device 200 is being used, at step S304. Thus, the control unit 260 informs the first user terminal 110 used by the first user that the financial device 200 is being used. At this time, a case in which the financial device 200 is performing a counting operation according to a request from the second user will be taken as an example, for convenience of description.

Then, the financial device 200 continues the counting operation according to the request of the second user at step S305. When the counting operation is ended, the control unit 260 outputs the counting result to the second display module 320, at step S306.

When it is determined at step S303 that the financial device 200 is not performing a counting operation, the control unit 260 determines that the financial device 200 is occupied by another user, and informs the first user terminal 110 that the financial device 200 is occupied by another user, at step S307. Then, the control unit 260 continues the occupied process for the second user terminal 120 at step S308.

On the other hand, when it is determined at step S302 that the financial device 200 is idle, the control unit 260 allows an occupation of the first user at step S309, and controls the first user terminal 110 of the first user to occupy the financial device 200 at step S310. FIG. 5 illustrates an example in which the first user requested an occupation. However, even when the second user requests an occupation, the same process as the process of FIG. 5 may be applied.

According to the present embodiment, the state of the financial device 200 may be determined through only one operation of pressing the first button 210 the control unit 260, and two kinds of operations such as the occupation handling process and the counting process can be collectively performed. Furthermore, the financial device 200 can simplify the business handling procedure of the users, and the users can perform a simple counting operation while using the financial device, thereby increasing the customer reception efficiency. Furthermore, since two users can independently use the counting process while sharing one financial device, the device introduction cost can be saved.

Figure 6:
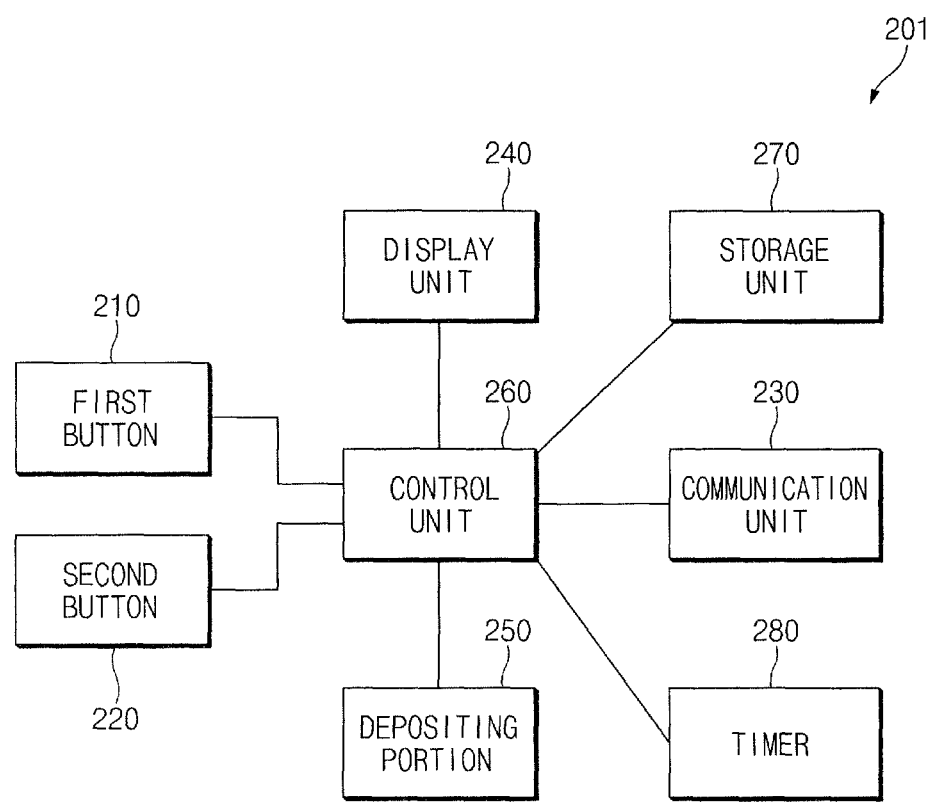
FIG. 6 is a block diagram illustrating components of a financial device according to another embodiment.

FIG. 6 is a block diagram illustrating components of a financial device according to another embodiment. The financial device 201 according to the present embodiment comprises a first button 210, a second button 220, a communication unit 230, a display unit 240, an depositing portion 250, a control unit 260 and a storage unit 270. The financial device 201 additionally comprises a timer 280. The following descriptions will be focused on components different from those of the financial device 200 of FIG. 2. Furthermore, the first and second buttons 210 and 220 may be implemented with protruding hardware buttons, switches, and touch buttons. In the present embodiment, however, the case in which the first and second buttons 210 and 220 are implemented with hardware buttons will be taken as an example for description.

When the first button 210 is pressed by a first user or the second button 220 is pressed by a second user, the timer 280 counts the time during which the corresponding button is pressed. That is, the timer 280 counts a selection portion press time during which a button signal from the first or second button 210 or 220 is transmitted to the control unit 260. Hereafter, the selection portion press time will be referred to as a duration time.

In the present embodiment, a plurality of processes are allocated to each of the first and second buttons 210 and 220. For example, each of the first and second buttons 210 and 220 may be matched with two or more of a media counting process, a deposit process, a withdrawal process and a counterfeit detection process. The matching between the buttons and the processes may be determined according to the duration time during which the buttons are pressed or clicked.

The control unit 260 receives the duration time of the button signal generated by the first or second button 210 or 220 from the timer 280. The control unit 260 compares the received duration time to a reference time, and determines a process selected by the first or second user. Furthermore, when the first or second button 210 or 220 is pressed, the control unit 260 determines the current state of the financial device 201. When the financial device 201 is idle, the control unit 260 performs an operation corresponding to the selected process on the media of the depositing portion 250. When the first or second button 210 or 220 is pressed but the financial device 201 is not idle, the control unit 260 ignores the pressing operation for the first or second button 210 or 220 and continues the ongoing operation, as described with reference to FIGS. 2 to 5.

When it is determined that the selected process was changed according to the received duration time, the control unit 260 may generate an alarm through the display unit 240 or a speaker or LED (not illustrated).

Furthermore, when the first or second button 210 or 220 is pressed, the display unit 240 may display a currently selected process. At this time, as the time during which the first or second button 210 or 220 is pressed increases, the determination result of the process selected by the first or second user may be changed. Thus, the display unit 240 may reflect the determination result of the control unit 260 in real time, and change the display of the selected process.

The storage unit 270 may store the duration time during which the first or second button 210 or 220 is pressed, in addition to the time points that the first or second button 210 or 220 is pressed or clicked or how many times the first or second button 210 or 220 is pressed or clicked, as the information on the first or second button 210 or 220.

Hereafter, referring to FIGS. 7 to 8, a control method of the financial device 201 will be described in detail.

Figure 7:
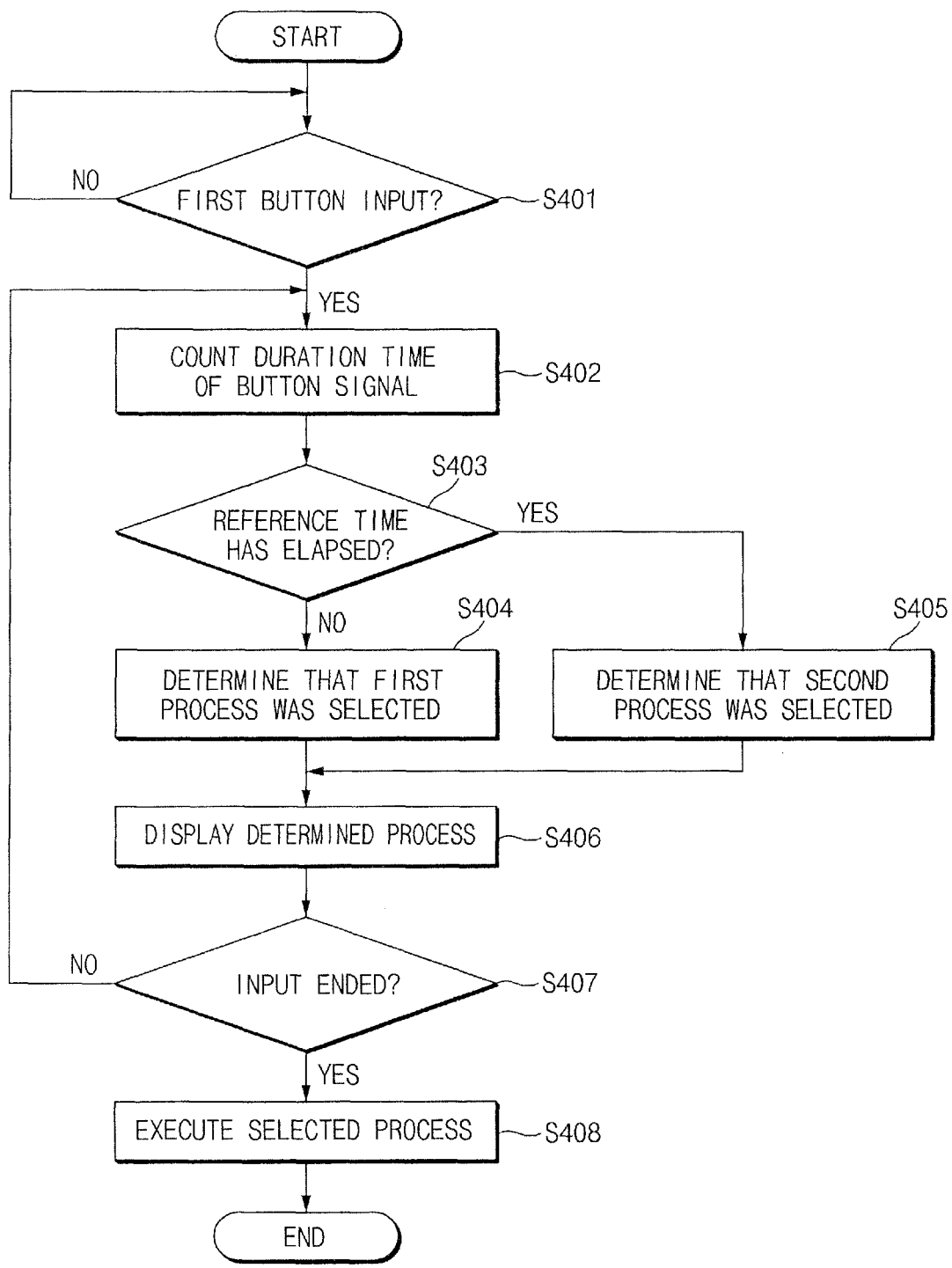
FIG. 7 is a flowchart showing a control method of a financial device according to another embodiment.

FIG. 7 is a flowchart showing a control method of a financial device according to another embodiment. The control method of the financial device 201, which will be described with reference to FIG. 7, relates to the operation of the financial device 201 for one or more user terminals 110 and 120, when each of the first and second buttons 210 and 220 are matched with a plurality of processes. In the present embodiment, a case in which the first button 210 is pressed will be taken as an example for description. FIG. 7 illustrates a process when the first button 210 is first pressed. However, even when the second button 220 is pressed, the same process as the process of FIG. 7 may be applied.

Referring to FIG. 7, the control unit 260 detects whether the first button 210 is pressed or clicked by a user, at step S401. When a button signal is inputted as the first button 210 is pressed, the timer 280 counts the duration time during which the button signal is inputted, at step S402.

The control unit 260 receives the duration time from the timer 280, and compares the received duration time to the reference time, at step S403. When it is determined that the duration time is shorter than the reference time, the control unit 260 determines that the first process was selected, at step S404. On the other hand, when it is determined that the duration time is longer than the reference time, the control unit 260 determines that the second process was selected, at step S405.

The control unit 260 controls the display unit 240 to display the process which was determined to be selected at step S404 or S405, at step S406.

Then, the control unit 260 determines whether a button input from the first button 210 was ended, at step S407. When the button input was ended, the control unit 260 executes the selected process based on the count value of the timer 280 at the point of time that the button input was ended, at step S408. For example, when the duration time is short because the first button 210 was slightly pressed, that is, when the duration time is shorter than the reference time, the control unit 260 may select and perform the simple counting process. On the other hand, when the duration time is equal to or longer than the reference time because the first button 210 was pressed for a long time, the control unit 260 may select the note classification process of counting media while classifying the types of the media.

In the present embodiment, the case in which each of the first and second buttons 210 and 220 is matched with two processes has been taken as an example for description. However, the present embodiment is not limited thereto, but each of the first and second buttons 210 and 220 may be matched with three or more processes. In this case, the number of reference times may be differently set according to the number of mapped processes. For example, first and second reference times may be set.

Although not illustrated, the financial device 201 may return the selected process to the initial process, after the execution of the selected process is ended. For example, when the initial process was the simple counting process and the process selected according to the press duration time of the first button 210 was the note classification process, the simple counting process may be set to the initial process after the note classification process is ended. In this state, the financial device 201 may be set in the idle state. Thus, when the first button 210 is slightly pressed again, the simple counting process may be selected and executed.

However, this is only an example, but the present embodiment is not limited thereto. For example, the finally executed process may be set to the initial process, and another process among the plurality of processes may be set to a subsequent process according to a duration time. In this case, the note classification process may be set to the initial process after the execution of the note classification process is ended, and the other processes may be set to processes which are sequentially selected according to the duration time.

Figure 8:
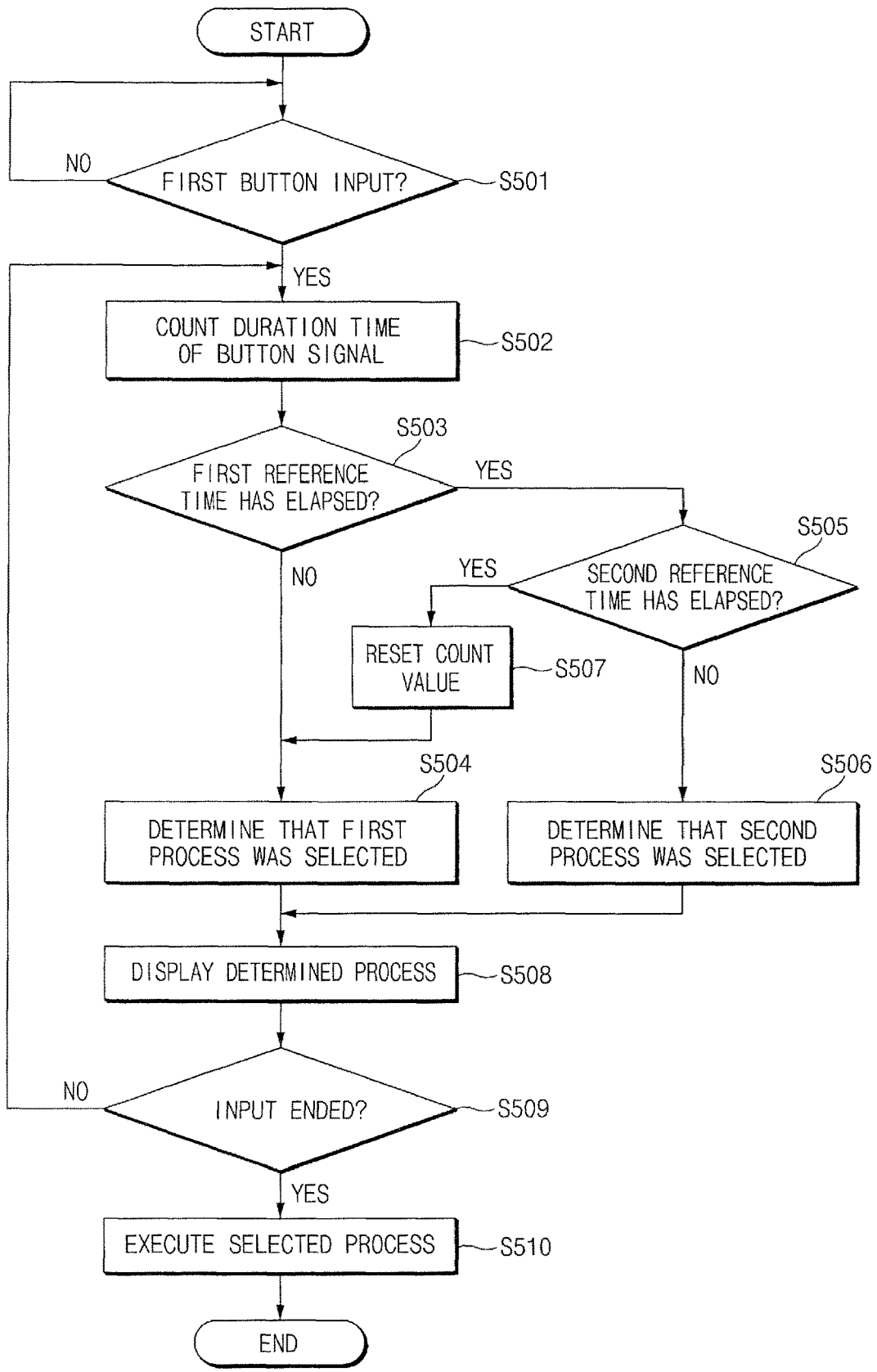
FIG. 8 is a flowchart showing a control method of a financial device according to another embodiment.

FIG. 8 is a flowchart showing a control method of the financial device 201 according to another embodiment. The control method of the financial device 201, which will be described with reference to FIG. 8, relates to the operation of the financial device 201 for one or more user terminals 110 and 120, when each of the first and second buttons 210 and 220 is matched with a plurality of processes. In the present embodiment, a case in which the first button 210 is pressed will be taken as an example for description. FIG. 8 illustrates a process when the first button 210 is first pressed. However, even when the second button 220 is first pressed, the same process as the process of FIG. 7 may be applied.

Referring to FIG. 8, the control unit 260 detects whether the first button 210 is pressed or clicked by a user, at step S501. When a button signal is inputted as the first button 210 is pressed, the timer 280 counts the duration time during which the button signal is inputted, at step S502.

The control unit 260 receives the duration time from the timer 280, and compares the received duration time to a first reference time, at step S503. When it is determined that the duration time is shorter than the first reference time, the control unit 260 determines that the first process was selected, at step S504. On the other hand, when it is determined that the duration time is longer than the first reference time, the control unit 260 compares the duration time to a second reference time at step S505. When it is determined that the duration time is shorter than the second reference time, the control unit 260 determines that the second process was selected, at step S506. When it is determined that the duration time is longer than the second reference time, the control unit 260 returns the initial process to the preset process such that the first or second process can be matched again. For this operation, the control unit 260 may reset the count value of the timer 280 so as to reset the duration time at step S507, and determine that the first process was selected, at step S504.

The control unit 260 controls the display unit 240 to display the process which was determined to be selected at step S504 or S505, at step S507.

Then, the control unit 260 determines whether a button input from the first button 210 was ended, at step S508. When a button input was ended, the control unit 260 executes the selected process based on the count value of the timer 280 at the point of time that the button input was ended, at step S509. For example, when the duration time is short because the first button 210 was slightly pressed, that is, when the duration time is shorter than the first reference time, the control unit 260 may select the simple counting process. On the other hand, when the duration time is longer than the first reference time and shorter than the second reference time because the first button 210 was pressed for a relatively long time, the control unit 260 may select the note classification process of counting media while classifying the types of the media. Furthermore, when the duration time is longer than the second reference time because the first button 210 was pressed for a long time, the control unit 260 may circulate and change As such, the various processes of the financial device 201 can be used only through the operation of pressing the first button 210. Furthermore, when the control method is combined with the embodiments of FIGS. 3 to 5, the control unit 260 may determine the state of the financial device 201 and collectively process two processes such as the occupation handling process and the counting process. Furthermore, the financial device 200 can simplify the business handling procedure of users, and the users can perform a simple counting operation while using the financial device, thereby increasing the customer reception efficiency. Furthermore, since two users can independently use the counting process while sharing one financial device, the device introduction cost can be saved.

So far, the specific embodiments for promoting understanding of the present invention have been described in detail. Thus, the components described in this specification, the connections and relationships therebetween, and the processes thereof are only examples. In the present embodiments, the financial device 200 may comprise various types of ATMs which are formed in a bank or public office. Furthermore, the user terminals 110 and 120 may comprise various types of computing devices such as smart phones, smart pads, table PCs and PDAs. In the present specification, the components 210 to 260 of the financial device 200 are physically integrated. However, each of the components may be physically separated or integrated with one or more components, if necessary.

Furthermore, the components of the system may be connected to each other through arbitrary digital data communication (for example, communication network). Examples of the communication network may comprise NFC (Near Field Communication), LAN (Local Area Network), WAN (Wide Area Network) and the Internet.

So far, it has been described that all of the components forming the embodiment of the present invention are coupled and operated as one unit. However, the present invention is not limited thereto. That is, one or more of the components may be selectively coupled and operated without departing the scope of the present invention. Furthermore, each of the components may be implemented as independent hardware. However, a part or all of the components may be selectively combined, but implemented as a computer program having a program module which executes a part or all of processes combined in one or more pieces of hardware. Codes and code segments forming the computer program may be easily inferred by those skilled in the art. Such a computer program may be stored in computer readable media and read and executed by a computer, thereby implementing the embodiments of the present invention. The storage media of the computer program may comprise magnetic recording media, optical recoding media and carrier wave media.

Furthermore, when it is described that one element "comprises", "includes" or "has" some elements, it should be understood that it may comprise (or include or has) only those elements, or it may comprise (or include or have) other elements as well as those elements if there is no specific limitation. The terms including technical or scientific terms have the same meanings as the terms which are generally understood by those skilled in the art to which the present invention pertains, as long as they are differently defined. The terms defined in a generally used dictionary may be analyzed to have meanings which coincide with contextual meanings in the related art. As long as the terms are not clearly defined in this specification, the terms may not be analyzed as ideal or excessively formal meanings.

According to the embodiments of the present invention, the financial device can perform a matched process only through an operation of pressing a button mounted therein without an operation of a user terminal connected to the financial device, and automatically output the performance result, thereby increasing the convenience.

While various embodiments have been described above, it will be understood to those skilled in the art that the embodiments described are by way of example only. Accordingly, the disclosure described herein should not be limited based on the described embodiments.

What is claimed is:

1. A financial device connected to a teller computer comprising:
   one or more selection interfaces each being matched with at least one of a plurality of financial processes; and
   a processor operationally connected to the one or more selection interfaces,
   wherein the processor is configured to:
   detect whether the one or more selection interfaces are input;
   count an input time of the one or more selection interfaces, when the one or more selection interfaces are input, wherein the plurality of financial processes is selected based on the input time of the one or more selection interfaces;
   determine a selected process among the plurality of financial processes based on comparison of the input time of the one or more selection interfaces and a reference time; and
   perform the selected process, with or without a command transmitted from the teller computer, and
   wherein the one or more selection interfaces comprise a first selection interface that is matched with a simple counting process, a second selection interface that is matched with a designated number counting process of counting media on a basis of a previously designated number, and a third selection interface that is matched with a note classification process of counting media while classifying types of the media,
   wherein the processor is configured to generate an alarm when the selected process is changed,
   wherein the processor is further configured to set a finally executed process to an initial process, and set another process among the plurality of financial processes to a subsequent process based on the input time, and
   wherein the processor is further configured to collectively perform an occupation handling process of the teller computer and the at least one of the plurality of financial processes in response to an input through any one of the one or more selection interfaces.

2. The financial device of claim 1, wherein the processor is configured to store instructions for performing the plurality of financial processes.

3. The financial device of claim 1, wherein when the selection interface input time is less than the reference time, the processor is configured to determine whether the simple counting process is selected, and
   when the selection interface input time is equal to or more than the reference time, the processor is configured to determine whether the note classification process of counting media while classifying types of the media is selected.

4. The financial device of claim 1, wherein the processor is configured to display a process determined by the processor according to the selection interface input time.

5. The financial device of claim 1, wherein the processor is configured to generate an alarm when a first process among the plurality of processes is changed to a second process of the plurality of the processes according to the selection interface input time.

6. The financial device of claim 1, wherein the processor is configured to communicate with one or more user terminals and one or more display modules.

7. A control system of a financial device connected to a teller computer comprising:
   one or more user terminals configured to transmit one or more process requests; and
   the financial device comprising:
   one or more selection interfaces each being matched with at least one of a plurality of financial processes; and
   a processor operationally connected to the one or more selection interfaces,
   wherein the processor is configured to:
   detect whether the one or more selection interfaces are input;
   count an input time of the one or more selection interfaces, when the one or more selection interfaces are input, wherein the plurality of financial processes is selected based on the input time of the one or more selection interfaces;
   determine a selected process among the plurality of financial processes based on comparison of the input time of the one or more selection interfaces and a reference time; and
   perform the selected process, with or without a command transmitted from the teller computer, and
   wherein the one or more selection interfaces comprise a first selection interface that is matched with a simple counting process, a second selection interface that is matched with a designated number counting process of counting media on a basis of a previously designated number, and a third selection interface that is matched with a note classification process of counting media while classifying types of the media,
   wherein the processor is configured to generate an alarm when the selected process is changed,
   wherein the processor is further configured to set a finally executed process to an initial process, and set another process among the plurality of financial processes to a subsequent process based on the input time, and
   wherein the processor is further configured to collectively perform an occupation handling process of the teller computer and the at least one of the plurality of financial processes in response to an input through any one of the one or more selection interfaces.

8. A control method of a financial device connected to a teller computer comprising one or more selection interfaces and a processor, comprising:
   detecting, by the processor, whether one or more selection interfaces are input, the one or more selection interfaces each being matched with a plurality of processes;
   counting an input time of the one or more selection interfaces, when the one or more selection interfaces are input, wherein the plurality of processes is selected based on the input time of the one or more selection interfaces;
   determining a selected process among the plurality of processes based on comparison of the input time of the one or more selection interfaces and a reference time;
   performing, by the processor of the financial device, the selected process, with or without a command transmitted from the teller computer,
   generating an alarm when the selected process is changed, and
   setting a finally executed process to an initial process, and setting another process among the plurality of processes to a subsequent process based on the input time, wherein the one or more selection interfaces comprise a first selection interface that is matched with a simple counting process, a second selection interface that is matched with a designated number counting process of counting media on a basis of a previously designated number, and a third selection interface that is matched with a note classification process of counting media while classifying types of the media, and wherein the processor is further configured to collectively perform an occupation handling process of the teller computer and the at least one of the plurality of financial processes in response to an input through any one of the one or more selection interfaces.

* * * * *